United States Patent [19]

Foster

[11] Patent Number: 5,287,414
[45] Date of Patent: Feb. 15, 1994

[54] CODED FILE LOCATOR SYSTEM

[75] Inventor: A. Eugene Foster, Yarmouth Port, Mass.

[73] Assignee: Esselte Pendaflex Corporation, Garden City, N.Y.

[21] Appl. No.: 718,607

[22] Filed: Jun. 21, 1991

[51] Int. Cl.⁵ .............................................. G06K 9/00
[52] U.S. Cl. ........................................ 382/1; 40/378; 235/383; 235/385; 414/273; 382/65
[58] Field of Search ............... 382/1, 59, 58, 65; 235/385, 383, 486; 312/184; 414/273, 282; 40/378

[56] References Cited

U.S. PATENT DOCUMENTS

| | | |
|---|---|---|
| 4,204,639 | 5/1980 | Barber et al. ..................... 235/462 |
| 4,219,296 | 8/1980 | Fujii et al. ......................... 414/273 |
| 4,240,848 | 12/1980 | Barber ................................. 156/64 |
| 4,457,016 | 6/1984 | Pfeffer ................................ 382/59 |
| 4,472,898 | 9/1984 | Tanaka ................................ 40/378 |
| 4,580,815 | 4/1986 | Barber ................................. 283/81 |
| 4,582,987 | 4/1986 | Bianco .............................. 235/385 |
| 4,636,634 | 1/1987 | Harper et al. .................... 235/385 |
| 4,783,740 | 11/1988 | Ishizawa et al. ................. 235/385 |
| 4,866,255 | 9/1989 | Sing .................................. 235/385 |
| 4,874,187 | 10/1989 | Schaufeld ........................... 283/70 |
| 4,932,683 | 6/1990 | Perazza .............................. 283/74 |

Primary Examiner—Joseph Mancuso
Attorney, Agent, or Firm—Pennie & Edmonds

[57] ABSTRACT

File folders are provided with unique machine-readable indicia representing the contents therein. Scanners sensitive to the machine-readable indicia are mounted to filing cabinets so that, upon opening or closing a drawer, the indicia on the folders within that drawer are automatically scanned. The indicia scanned are then input to a computer system that logs the scanned folders as being located in that drawer.

24 Claims, 4 Drawing Sheets

CODED FILE LOCATOR SYSTEM

FIELD OF THE INVENTION

The present invention relates to a filing system and, more specifically, to an automatic system for locating and tracking file folders.

BACKGROUND OF THE INVENTION

The number and enormity of problems associated with keeping track of files in an office setting are well-known and have plagued office workers since the first filing system was implemented. The clerical time and effort, as well as the payroll output exerted, to locate files is incalculable when extended to the millions of offices worldwide.

Several time-consuming tasks are associated with maintaining a file-folder system, such as the hanging folder system manufactured by Esselte Pendaflex Corporation, Garden City, N.Y. To maintain these folders in an orderly fashion, a secretary must first type a label, insert it into a plastic tab, and affix the tab to the folder. The folders must then be filed in an organized fashion to minimize the time necessary to locate the folder in the future. Unfortunately, folders are frequently misfiled, which can multiply the time taken to locate them and refile them in their proper place. When folder contents are discarded and the folders can be reused, new labels must be typed to replace the old ones. Transferring folders between an active filing area and a storage area can also be a major time-consuming task, especially if incorrect files are unknowingly and unintentionally sent to storage.

It has thus been a goal of prior designers to create a system that would reduce the effort and time involved with otherwise unruly filing systems. It is known in the art, for example, to put machine-readable codes onto shelf-filed folders, such as those often seen in medical or other professional offices. The file folders may contain color and alphabetical coding or a machine code so that the file can be taken from the shelf and passed by hand under a scanner. This can automatically call up a computer record to the user's screen for the patient whose file is scanned. Such shelf-filed folders are disclosed, for example, in U.S. Pat. Nos. 4,240,848 and 4,580,815. In these patents, both human- and machine-readable indicia are added to the side of a shelf-filed folder. These patents, however, merely disclose labels and labelling systems that can codify folders, but do not include the necessary means for automatically locating or tracking the folders based on the coded labels.

U.S. Pat. No. 4,457,016 discloses a computer file tracking system with a hand-held scanner that can read codes on folders when manually passed over the codes. This requires every folder to be manually scanned one-at-a-time as they are moved—a time-consuming and easily forgotten task.

It is thus an object of the present invention to provide a folder locating and tracking system that allows instant locating of any folder within the system.

It is another object of the present invention to provide a file folder locating and tracking system wherein location information for a given folder is automatically entered into the system without user effort.

It is a further object of the present invention to provide a file folder locating and tracking system wherein filing time spent by secretaries and file room personnel is significantly decreased, and significant cost savings for an office using this system are realized.

It is yet another object of the present invention to provide a file folder and identifying tab for use in an automated file folder locating and tracking system.

It is a still further object of the present invention to provide a file folder locating and tracking system wherein the component parts are relatively inexpensive and simple to implement and operate.

SUMMARY OF THE INVENTION

In accordance with the present invention, file folders are provided with unique machine-readable indicia representing the contents therein. Scanners sensitive to the machine-readable indicia are mounted to filing cabinets so that, upon opening or closing a drawer, the indicia on the folders within that drawer are automatically scanned. The indicia scanned are then input to a computer system that logs the scanned folders as being located in that drawer.

BRIEF DESCRIPTION OF THE DRAWINGS

The foregoing and other objects and advantages of the present invention will become apparent to those skilled in the art upon reading the detailed description of the preferred embodiments in conjunction with a review of the appended drawings, in which.

DETAILED DESCRIPTION OF THE PREFERRED EMBODIMENT

Figure 1:
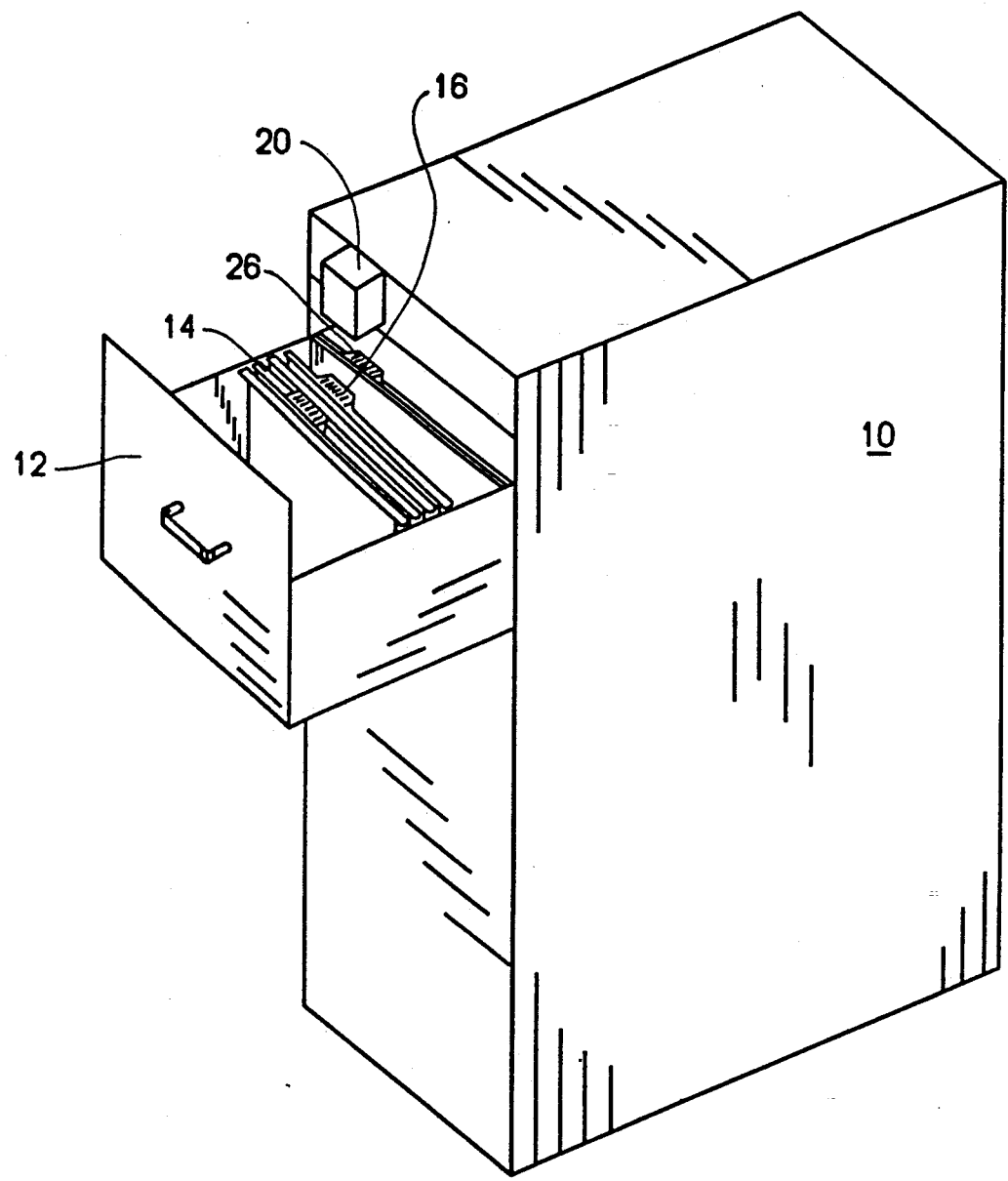
FIG. 1 is a perspective view of a filing cabinet including a portion of a file folder locating and tracking system according to the present invention.

Referring now to the drawings, a file cabinet 10 is shown in FIG. 1, with the top drawer 12 open. Within the top drawer 12 there are a plurality of hanging file folders 14, such as catalog no. 4153, manufactured by Esselte Pendaflex Corporation. Any known hanging file folder which can receive coded indicia as described below will work similarly. Attached to the top of the folders 14 are identification tabs 16. Previous to the present invention, these tabs were used to hold small cards with printed or typed characters for visual identification by a user of the contents of the folders 14. The user may be any person, such as a secretary or file room worker, who is responsible for the filing and retrieval of file folders.

Figure 2:
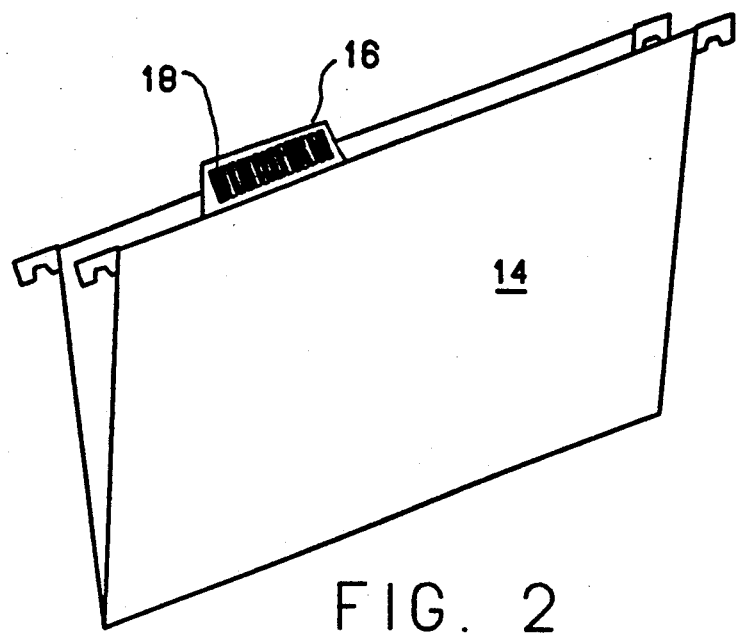
FIG. 2 is a perspective view of a file folder having machine-readable indicia according to the present invention.
Figure 5:
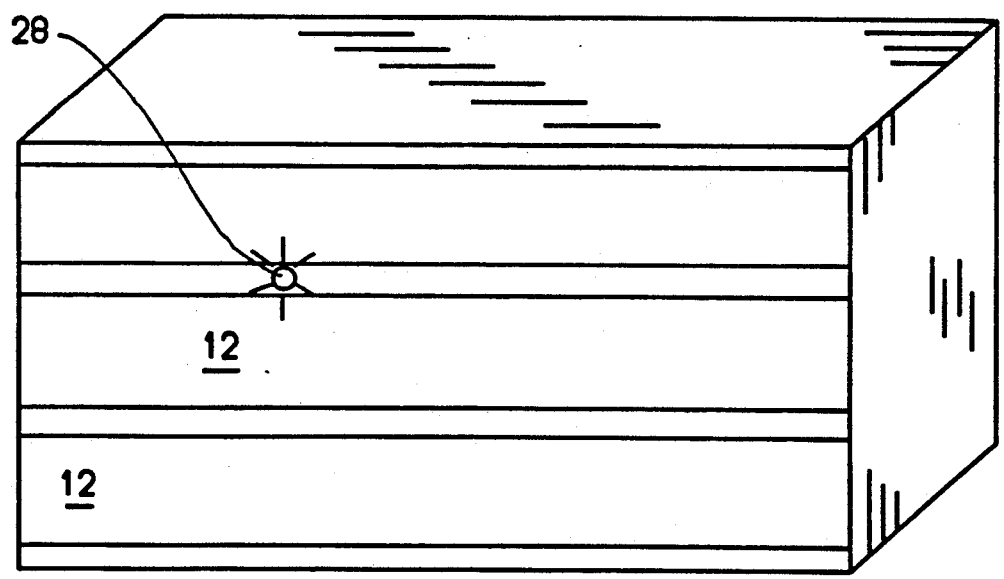
FIG. 5 is a perspective view of an array of filing drawers including a filing system according to the present invention.

In the preferred embodiment, these tabs 16 include embedded machine-readable indicia, such as a bar code 18 (FIG. 2). As non-limiting examples, other types of indicia that could be used include any of the OCR (optical character recognition) sets, MICR (magnetic ink character recognition) sets, or coded magnetic strips.

FIG. 2 shows in greater detail a hanging file folder 14 carrying a bar-coded tab 16 according to the preferred embodiment. It is to be understood that each file folder 14 in a given system will have a unique identifying bar code 18. Numerals corresponding to the bar code 18 can be printed below the code so the user will be able to read the code identifying the contents of the folder.

Figure 4:
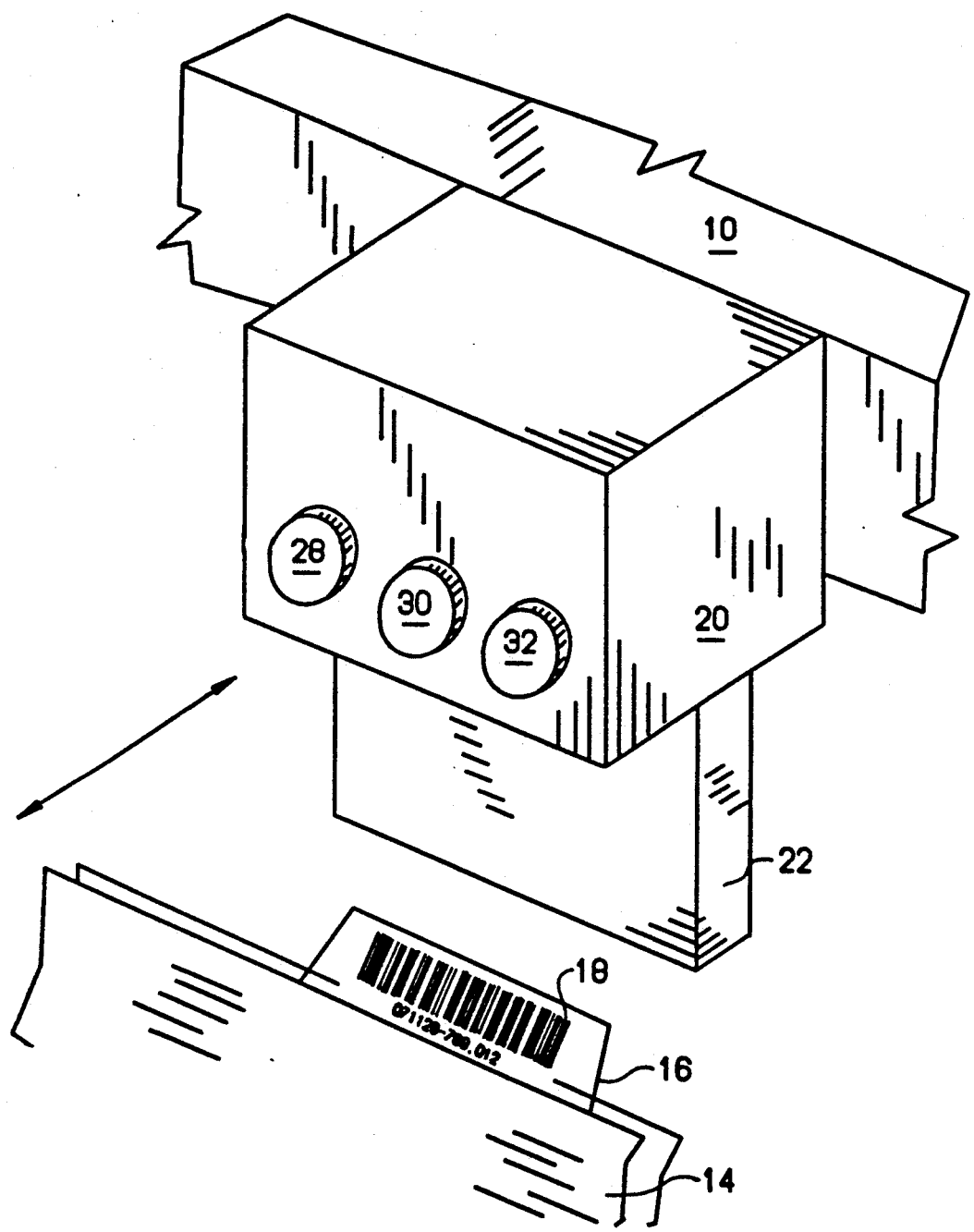
FIG. 4 is a perspective view of a scanner and file folder on a filing cabinet, according to the present invention.

Referring again to FIG. 1, a scanner 20 is mounted to the housing of the file cabinet 10. The scanner 20 is mounted above the drawer 12, so that its sensor beams 22 (FIG. 4) will be directed down onto the file folders 14. Although only one scanner 20 is shown in FIG. 1, it is to be understood that each drawer 12 in an office complex would have a scanner 20 mounted over it or one scanner could be mounted in the top of a stack of drawers with the scanner being capable of reading all drawers below. Plug-in scanners are also a possibility. The scanners 20 can be mounted on the exterior of the cabinet 10 extending forward of the closed drawers 20, or be mounted within the cabinet 10 above the drawers 14. The scanner 20 is positioned so that its sensors are directly above the machine-readable code 18 on the folders 14. In the preferred embodiment, the scanner 20 is an infrared scanner, similar to those used at grocery line checkout counters, with the infrared beams 22 as shown in FIG. 4.

Checkout counter scanners are capable of detecting and correctly reading a bar code in any orientation facing the scanner, but not always on the first pass. In the preferred embodiment, all the folders 14, and thus the coded tabs 16, will be substantially parallel, due to their common hanging rails within the drawer 12. Therefore, the scanner 20 can be designed for maximum effectiveness along one axis, as shown. The scanner in FIG. 4 can also be limited in size to scan an area approximating the tab size. Usually, in conventional tab systems, the tabs are staggered along the lengths of the folders to reduce overlap, making the tabs more visible to a user from the front of a drawer. In the preferred form of the present system, however, the tabs 16 would all be placed on the same area of the hanging folders 14, as shown in FIG. 1, eliminating the need for a large, and more expensive, scanner 20.

Figure 3:
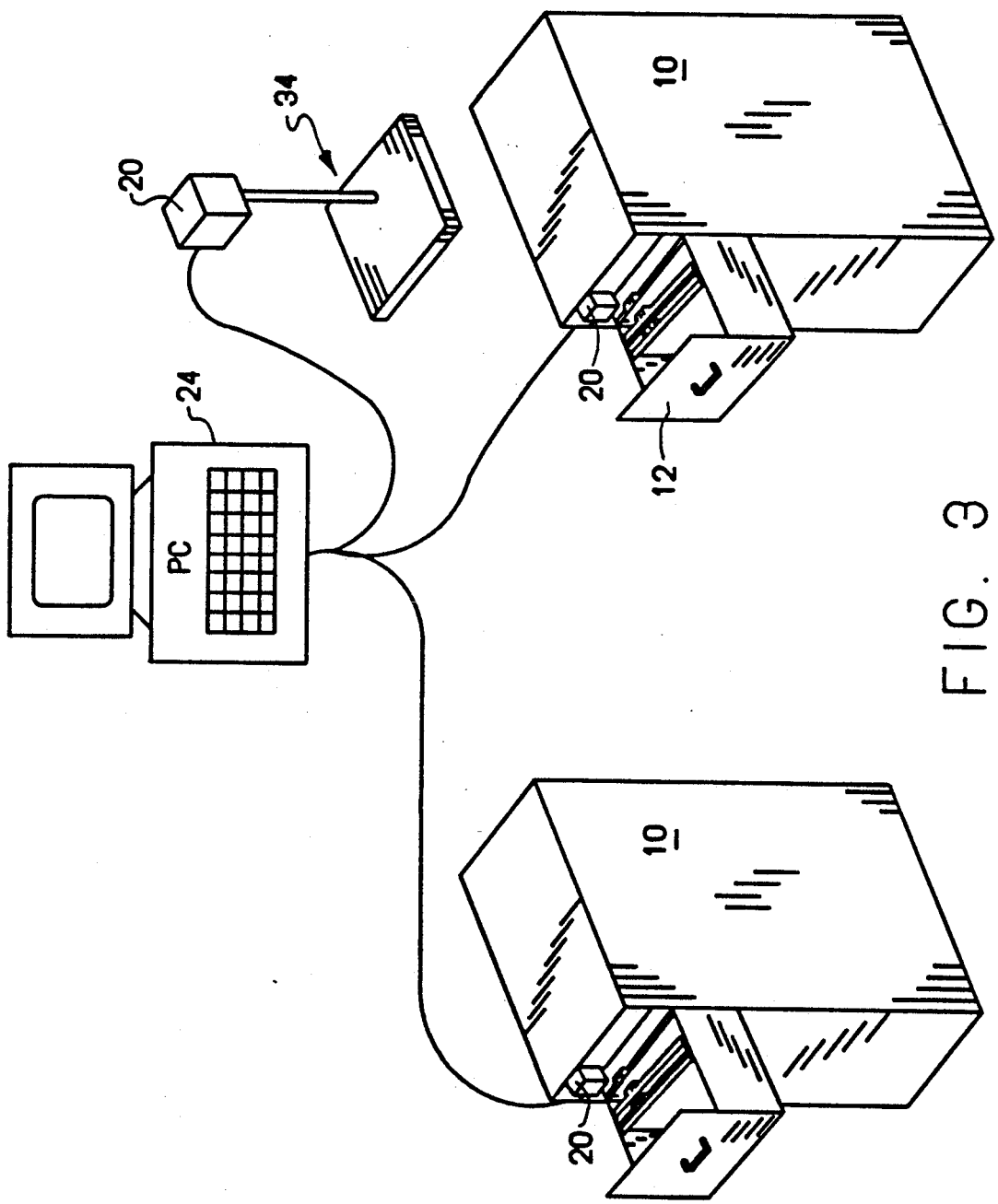
FIG. 3 is a perspective view of a data storage and retrieval device according to the present invention.

In FIG. 3, a data storage and retrieval device, such as a personal computer 24, is connected to all the scanners 20 in the system. The computer 24 maintains a record on each file folder 14, including the folder's unique bar code 18, its contents, and its present location. The computer 24 receives the location information automatically from the various scanners 20 located around an office. An office, for the purpose of this description, can include many rooms, or even buildings, that contain file cabinets 10 with coded folders 14 in them. Of course, it would be obvious that larger, networked computers would be needed for very large office complexes.

In operation, some preliminary input is necessary when a new folder 14 is introduced to the system. A unique coded tab 16, which could be provided in sets by the manufacturer or produced on-site, is attached to a file folder 14. The unique code 18 on the tab 16 is then manually entered or scanned into the computer 24, along with the folder's contents or subject matter. The computer 24 now will automatically track the folder until it is removed from the computer's memory, such as when the folder 14 is destroyed.

When the folder 14 is ready to be put into a drawer 12, the desired drawer 12 which may be any drawer in the system is opened by the user. As the drawer 12 is opened, all of the coded tabs 16 on the folders 14 already in the drawer 12 will pass by the infrared beams 22 of the scanner 20 mounted adjacent that drawer 12. FIG. 4 shows the scanning area of the infrared beams 22. The codes 18 for those folders 14 will be input to the computer 24 along with a code for that drawer 12, thus updating the location information for all of those folders 14. The code for the drawer 12 can be programmed into each scanner 20. For greater flexibility, however, a bar code 26 (FIG. 1) for the drawer 12 could be mounted at the front or rear of the drawer 12, which would be scanned along with the folders 14. If file cabinets 10 are moved from room to room, their location codes 26 could be easily transferred, if desired, or changed.

The user can now put the new folder 14 into the drawer 12. In the preferred embodiment, the folder 14 can be placed anywhere in the drawer, as explained below. However, additional conventional markings could be added to the folder for ordering its location, for example alphabetically, within the drawer 12, although the present invention makes it unnecessary.

The drawer 12, now containing the new folder 14, is then closed. All of the coded tabs again pass by the infrared beams 22 of the scanner 20. The codes 18 for the folders, as well as the drawer code 26, are again input to the computer 24, updating the location information for those folders 14. The record in the computer 24 for the new folder 14 now contains the appropriate drawer code 26. Besides the initial input, all the user needed to do was open the drawer 12, insert the new folder 14 any place in the drawer 12 and close it.

To retrieve a folder 14, a simple interrogation of the computer 24 is performed. Several terminals at any number of remote locations can be connected to the computer 24, with access to the folder records. A user enters into the computer 24 a description of the contents of the desired folder 14. The description can be used in a key word search by any conventional method to retrieve that folder's record, which includes the drawer 12 that the folder 14 is located in.

For some applications, displaying the drawer location on a screen is sufficient, but for larger applications the computer 24 activates a light 28 (as shown in FIG. 4) to indicate that the requested folder 14 is in that drawer 12. The computer 24 is now in a standby mode, wherein it waits until the user has located the folder 14 in the drawer 12 by the following method: The user opens the indicated drawer 12 containing the requested folder 14, causing the coded tabs 16 to be scanned. When the scanner 20 is over the requested folder 14, the computer activates an indicator 30, such as a buzzer or shutter light. This indicates to the user that the folder 14 is directly under the scanner 20. With this feature, it can be seen that the need to put the folders 14 within a drawer 12 in a particular order is eliminated. This also completely avoids the problems of misfiling folders 14 within a drawer 12, since the order is irrelevant. After sounding the buzzer 30, the computer 24 turns off the light 28 and waits for the next input of data or folder request.

The contents of the folder 14 or the entire folder 14 may now be reviewed or removed. If the contents of the folder are removed or reviewed, but the folder remains, no further action regarding the computer 24 is required by the user. However, if the folder 14 is removed, it is necessary to indicate this to the computer 24. In one embodiment, the computer 24 would simply compare the codes 18 scanned upon opening the drawer 12 with those scanned upon closing it. If a folder 14 is removed, it will automatically be detected in this manner. The user can also indicate the removal manually, using a button 32 shown in FIG. 4. The user pushes the button 32 to set up a removal sequence, puts the bar code 18 of the folder 14 under the scanner 20, and removes the folder. The computer would record that the folder 14 was removed from the drawer 12. It could also record the date and time the folder 14 was removed. If a user-identifying access procedure were added to the computer, it could also record the name of the user that retrieved the folder 14. The computer record would then show that the folder 14 was removed from the drawer 12 and is in use, until it is placed in a drawer 12 and scanned in that drawer 12, at which time the computer record would show that the folder 14 is contained in the new drawer 12.

In a situation where there are many drawers 12 in one place, such as a file room, the light 28 becomes very important, as merely displaying a code 26 for the proper drawer still requires the user to visually scan the drawers 12 to locate the proper one. With the lights 28, the time involved in finding the right drawer 12 is eliminated.

In a large filing system, where several standard folders could be contained within a single hanging folder 14, it is contemplated that a number of standard folders within a hanging folder could also be similarly coded. In that way, one standard folder in the hanging folder 14 can be removed one at a time, if desired, in a similar fashion as described above, but the standard folders would still be tracked by the computer 24. The computer 24 would then be used to tell the user in which hanging folder 14 to refile the standard folder.

In practice, a particularly helpful use of the system of the present invention is the transfer of folders 14 from active to storage areas. A constantly updated list of folders 14 held in storage can be generated, while countless hours are eliminated since users do not have to search for folders 14 that another user has mistakenly sent to storage.

Other embodiments of the invention are also contemplated, including the case where the folders hang parallel to the direction of drawer travel, as opposed to perpendicular, such as with legal size folders in a letter-size-wide drawer. In this case, a scanner 20 that spans the width of the drawer 12 would be needed.

Remote scanners 34 (FIG. 3) could also be placed at other locations, such as at workstations or on desktops, if it is expected that the folder would be used by an individual or a department for any length of time. The computer 24 could then record that the folder 14 is being held in that department.

As stated above, because the folders 14 are hanging parallel, causing the coded tabs 16 to be parallel, the chances of misreading a bar code 18 are greatly reduced. However, should the scanner 20 fail to scan a code 18 properly, another indicator, perhaps two quick tones from buzzer 30, could be sounded to alert the user that the drawer 12 should be scanned again.

Another feature of the present invention is that, unlike known machine-readable coding systems, this system is flexible. Since the bar codes 18 are embedded in plastic tabs 16, such as catalog item No. 42 manufactured by Esselte Pendaflex Corporation, they are interchangeable. If a folder is destroyed, the same code can be assigned to a new folder. Even if the file folder has just become worn out, a new folder can be used by simply moving the coded tab 16 to the new folder. No extra inputting of information into the computer 24 is necessary.

Thus, it can be seen that the preferred embodiments described greatly reduce the time spent by user's in locating, retrieving, and refiling file folders. The probability of losing files is also greatly diminished, as the computer records are constantly updated every time a drawer is opened or closed. The costs, both in time and money, for setting up a system according to the present invention, would be easily matched by savings gained in the use of the system.

While the embodiment of the invention shown and described is fully capable of achieving the results desired, it is to be understood that this embodiment has been shown and described for purposes of illustration only and not for purposes of limitation. It is therefore contemplated that many additions, modifications, and substitutions could be made without departing from the scope and spirit of the invention as defined in the accompanying claims.

I claim:

1. An automated file locator system for at least one file holder, said file holder having a housing and at least one folder carrier for holding a plurality of folders, said folder carrier being movable between an open and a closed position, comprising:
   a machine-readable code mounted on each of said folders;
   at least one code-reading means mounted on said housing adjacent said carrier, said code-reading means positioned on said housing such that movement of said carrier between the open and closed positions causes said code-reading means to automatically scan the machine-readable codes on said folders, said code-reading means generating signals corresponding to said codes in response to the scanning thereof; and
   control means for receiving the signals from said code-reading means and indicating that a folder with a particular code is located in said folder carrier.

2. A file locator system as in claim 1 wherein said file holder has a plurality of folder carriers.

3. A file locator system as in claim 2 wherein the code on each of said folders is unique.

4. A file locator system as in claim 3 wherein said folder carriers are drawers and said file holder is a file cabinet.

5. A file locator system as in claim 4, said system having a plurality of file holders, each file holder having at least one indicator connected to said control means.

6. A file locator system as in claim 5 wherein said control means is an electronic data storage and retrieval means.

7. A file locator system as in claim 6 wherein said data storage and retrieval means is at least one computer connected to a memory device.

8. A file locator system as in claim 7 wherein said file folders are hanging folders, said folders suspended transverse to a direction of travel of said drawers.

9. A file locator system as in claim 8 wherein said machine readable code is a bar code, said code being embedded in an interchangeable tab attached to a top surface of said folders.

10. A file locator system as in claim 7, said code-reading means having two indicators for receiving signals from said control means and a button for sending control signals to said control means.

11. A file locator system as in claim 10, wherein one of said indicators is energized by said control means when a particular folder in said carrier is adjacent said code-reading means on which said one of said indicators is mounted.

12. A file locator system as in claim 4, wherein each of said at least one code-reading means is an infrared scanner.

13. A file locator system as in claim 12, wherein each of said at least one scanner is located above a corresponding one of said drawers on the exterior of said housing.

14. A file locator system as in claim 12, wherein each of said at least one scanner is located above a corresponding one of said drawers on the interior of said housing.

15. A file locator system as in claim 12 wherein said machine-readable code is a bar code.

16. A file locator system as in claim 1, further comprising a carrier-mounted machine-readable code mounted within each carrier, said carrier-mounted code being scanned along with said machine-readable code, and stored by said data storage and retrieval means.

17. An automated file locator system for a plurality file cabinets, each of said file cabinets having a housing and a plurality of drawers for holding a plurality of folders, said drawers being movable between an open and a closed position, said folders comprising hanging folders suspended transverse to a direction of travel of said drawers, said system comprising:
  a unique machine-readable code mounted on each of said folders, wherein said machine readable code is a bar code embedded in an interchangeable tab attached to a top surface of said folders;
  at least one code-reading means mounted on said housing adjacent a corresponding drawer, said at least one code-reading means positioned on said housing such that movement of said drawer between the open and closed positions causes said code-reading means to scan the machine-readable codes on said folders, said code-reading means generating signals corresponding to said codes in response to the scanning thereof;
  at least one computer connected to a memory device for receiving the signals from said code-reading means and indicating that a folder with a particular code is located in said drawer, each of said file cabinets having at least one indicator connected to said at least one computer; and
  at least one remote code-reading means mounted remote from said housing and outputting signals to said at least one computer when said bar code on one of said folders passes by one of said remote code-reading means.

18. A file cabinet for use in an automated file locator system having a plurality of file folders, said folders each having a machine-readable code, comprising:
  at least one folder carrier, said carrier movably mounted within said cabinet; and
  at least one code-reading means mounted adjacent said carrier and positioned to automatically read said codes in response to movement of said carrier within said housing.

19. A method of processing file location information, comprising the steps of:
  (a) providing a cabinet having at least one drawer and a scanner adjacent to said drawer;
  (b) providing at least one file folder having a machine-readable code;
  (c) automatically scanning said code in response to movement of said drawer in said cabinet, such that said code passes said scanner, said scanner producing signals corresponding to said code;
  (d) storing said signals and said location; and
  (e) outputting said code and said location.

20. The method of claim 19 which further comprises mounted at least one remote code-reading means remote from said file cabinet, and outputting said code and said location from the remote code-reading means to a computer when one of said folders passes by said remote code-reading means.

21. An automated file locator system for a file cabinet having a housing and a plurality of drawers for holding a plurality of folders, said drawers being movable between an open and a closed position, said folders comprising hanging folders suspended transverse to a direction of travel of said drawers, said system comprising:
  a unique machine-readable code mounted on each of said folders;
  at least one code-reading means mounted on said housing adjacent a corresponding drawer, said at least one code-reading means positioned on said housing such that movement of said drawer between the open and closed positions causes said code-reading means to scan the machine-readable codes on said folders, said code-reading means generating signals corresponding to said codes in response to the scanning thereof;
  at least one computer connected to a memory device for receiving the signals from said code-reading means and indicating that a folder with a particular code is located in said drawer, each of said file cabinets having at least one indicator connected to said at least one computer; and
  at least one remote code-reading means mounted remote from said housing and outputting signals to said at least one computer when said bar code on one of said folders passes by one of said remote code-reading means.

22. The system of claim 21 wherein the code mounted on each folder is a bar code embedded in an interchangeable tab attached to a top surface of the folder.

23. The system of claim 21 wherein the code is automatically scanned by the code-reading means in response to movement of the drawer in the cabinet.

24. An automated file location system comprising:
  a plurality of drawers;
  a plurality of scanners, each of said scanners adjacent to a corresponding one of said drawers; and
  a plurality of file folders wherein each drawer contains at least one of said file folders, each of said file folders having a detachable tab on a top surface of said folder, wherein a machine-readable code is formed on said tab, said code supplying information to said system through one of said scanners when one of said drawers is moved past said one of said scanners.

* * * * *